United States Patent [19]
Weis et al.

[11] 3,872,141
[45] Mar. 18, 1975

[54] 1-ALKOXYCARBOXYLIC ACID DERIVATIVES FOR THE REGULATION OF PLANT GROWTH

[75] Inventors: Claus Weis, Arlesheim; Hanspeter Fischer, Bottmingen, both of Switzerland

[73] Assignee: Ciba-Geigy Corporation, Ardsley, N.Y.

[22] Filed: Aug. 1, 1972

[21] Appl. No.: 277,013

[30] Foreign Application Priority Data
Aug. 3, 1971  Switzerland.................... 11390/71

[52] U.S. Cl........................ 260/413, 71/83, 71/84, 260/404, 260/343.6, 260/410.9 R, 260/535 R, 260/543 R, 424/315
[51] Int. Cl............................................. C08h 17/36
[58] Field of Search.................................. 260/413

[56] References Cited
UNITED STATES PATENTS
2,398,430  4/1946  Joyce............................ 260/413 X
3,732,264  5/1973  Baum et al..................... 260/408

FOREIGN PATENTS OR APPLICATIONS
625,361  8/1961  Canada........................... 260/413

OTHER PUBLICATIONS
Chem. Abstracts, 31 : 1358⁴.
Chem. Abstracts, 67 : 108156c.
Chem. Abstracts, 59 : 8610d.

*Primary Examiner*—Lewis Gotts
*Assistant Examiner*—Ethel G. Love
*Attorney, Agent, or Firm*—Harry Falber; Frederick H. Rabin

[57] ABSTRACT

1-Alkoxy-alk-3-ene-carboxylic acids and acid derivatives are effective agents for the influencing of plant growth; they are used, for example, for the control of fruit abscission and the regulation of the growth of side shoots.

1 Claim, No Drawings

1-ALKOXYCARBOXYLIC ACID DERIVATIVES FOR THE REGULATION OF PLANT GROWTH

The present invention relates to new 1-alkoxycarboxylic acids and 1-alkoxycarboxylic acid derivatives, to a process for their production, also to agents for the regulation of plant growth which contain these new 1-alkoxycarboxylic acids or 1-alkoxycarboxylic acid derivatives as active substances, and to processes for the regulation of plant growth by application of the new active substances or of agents containing them.

The new 1-alkoxycarboxylic acids and 1-alkoxycarboxylic acid derivatives correspond to formula Ia and Ib, respectively:

$$R_1 - \underset{R_2}{\overset{R_3}{C}} = C - \overset{R'}{CH} - \underset{OR_4}{CH} - CO - X \quad (Ia)$$

and $$\left( R_1 - \underset{R_2}{\overset{R_3}{C}} = - C - \overset{R'}{CH} - \underset{OR_4}{CH} - COO \right)_n \quad M^{n \oplus} \quad (Ib)$$

wherein R' is hydrogen or methyl; $R_1$ and $R_2$ each independently represent hydrogen or an alkyl radical; $R_3$ represents hydrogen, or an alkyl radical having 1 to 3 carbon atoms; $R_4$ represents an alkyl radical having 1 to 5 carbon atoms, a cycloalkyl, an aralkyl or aryl radical; n denotes the number 1 or 2; $M^{n+}$ represents an alkali metal ion or an alkaline-earth metal ion, or the ammonium ion $^+$—$N(R_5)_4$ carrying four independent substituents $R_5$ which can represent hydrogen, or an alkyl radical having at most 18 carbon atoms; and wherein also X represents hydroxyl, alkoxy having 1 to 6 carbon atoms, the cyclohexyloxy radical, or a radical $$-N\begin{matrix}Y_1\\Y_2\end{matrix}$$

wherein $Y_1$ and $Y_2$ each independently represent hydrogen, or an alkyl radical having in each case 1 to 5 carbon atoms; with $R_1$, $R_2$ and $R_3$ together being able to have up to 16 carbon atoms.

Alkyl radicals denoted by $R_1$, $R_2$ and/or $R_5$ can be straight-chain or branched. The following, for example, are suitable: methyl, ethyl, n-propyl, isopropyl, n-butyl, isobutyl, sec-butyl, tert-butyl, n-pentyl, n-hexyl, n-octyl, n-decyl, n-undecyl, n-dodecyl, n-tetradecyl and n-hexadecyl.

If $R_3$ represents an alkyl radical having 1 to 3 carbon atoms, then it is a case of the methyl, ethyl, n-propyl or isopropyl radical.

If $R_4$ represents an alkyl radical having 1 to 5 carbon atoms, then this can be straight-chain or branched, and denotes, for example, the methyl, ethyl, isopropyl, n-butyl, tert-butyl or n-amyl radical. Suitable cycloalkyl or aralkyl radicals denoted by $R_4$ are, e.g. the cyclohexyl, benzyl or phenethyl radical; and $R_4$ as aryl radical is, in particular, the phenyl radical.

Alkali metal ions and alkaline-earth metal ions represented by $M^{n+}$ are, in particular, the lithium, sodium or potassium ion and the magnesium, calcium or barium ion, respectively.

If X represents an alkoxy group having 1 to 5 carbon atoms, then suitable alkyl radicals are those mentioned under $R_4$. The following are mentioned as examples of X denoting a $$Y_1 - \overset{|}{N} - Y_2$$

radical: the amino, N-methylamino, N-ethylamino, N-isopropylamino, N-n-butylamino, N-n-amylamino, N,N-dimethylamino and N,N-diethylamino radical.

Particularly preferred compounds of formula Ia are those in which R', $R_2$ and $R_3$ each represent hydrogen, $R_1$ represents a straight-chain alkyl radical having 1 to 16, especially 3 to 8, carbon atoms, above all the hexyl radical, $R_4$ represents methyl, n denotes the number 1, and X represents the OH group.

The new 1-alkoxycarboxylic acids and 1-alkoxycarboxylic acid derivatives of formulae Ia and Ib, respectively, are produced according to the present invention by the treatment, in an alkaline medium, of a 1,1,1-trichloro-2-hydroxyalkene-4 of formula II $$R_1 - \underset{R_2}{\overset{R_3}{C}} = C - CH - \underset{OH}{\overset{R'}{CH}} - CCl_3 \quad (II),$$

wherein R', $R_1$, $R_2$ and $R_3$ have the meanings given under formula Ia and Ib, in an excess of an alcohol of formula III $$R_4 - OH \quad (III),$$

wherein $R_4$ has the meaning given under formula Ia and Ib; and, optionally, the subsequent conversion of the reaction product into the free carboxylic acid or, as defined, into salts, esters or amides.

As a rule, there are obtained mixtures of the cis and trans forms, with the trans form usually predominating. Both forms are, however, suitable for plant regulation.

The 1,1,1-trichloro-2-hydroxyalkenes-4 of formula II used for the production of the 1-alkoxycarboxylic acids and 1-alkoxycarboxylic acid derivatives according to the invention are known per se, or can be produced by known methods by the reaction of α-unsaturated aliphatic olefins with chloral, in the presence of a catalyst such as aluminum chloride [cp. Comptes rendus, 239 (1954) 541–43].

The following may be mentioned as examples of suitable compounds of formula II (boiling points in °C/Torr):

1,1,1-trichloro-2-hydroxypentene-4, B.P. 81°/11, 1,1,1-trichloro-2-hydroxy-4-methylpentene-4, B.P. 92°–93°/12, 1,1,1-trichloro-2-hydroxyhexene-4, B.P. 100°/13, 1,1,1-trichloro-2-hydroxyoctene-4, B.P. 76°–80°/0.7, 1,1,1-trichloro-2-hydroxy-3-methyl-3-methyl-octene-4, B.P. 97°–98°/12, 1,1,1-trichloro-2-hydroxynonene-4, B.P. 88°–90°/0.05, 1,1,1-trichloro-2-hydroxydecene-4, B.P. 105°/0.01, 1,1,1-trichloro-2-hydroxyundecene-4, B.P. 100°/0.001, 1,1,1-trichloro-2-hydroxydodecene-4, B.P. 130°/0.05, 1,1,1-trichloro-2-hydroxytridecene-4, B.P. 112°/0.001, 1,1,1-trichloro-2-hydroxytetradecene-4, B.P. 126°/0.001, 1,1,1-trichloro-2-hydroxypentadecene-4, B.P. 128°–130°/0.001, 1,1,1-trichloro-2-hydroxyhexadecene-4, B.P. 150°/0.001, 1,1,1-trichloro-2-hydroxyheptadecene-4, B.P. 167°/0.05, 1,1,1-trichloro-2-hydroxyoctadecene-4, B.P. 181°–185°/0.05, 1,1,1-trichloro-2-hydroxynonadecene-4, 1,1,1-trichloro-2-hydroxyeicosene-4, B.P. 189°/0.05, 1,1,1-trichloro-2-hydroxyheneicosene-4, B.P. 206°/0.01, 1,1,1-trichloro-2-hydroxytetracosene-4, M.P. 40°–45°

1,1,1-trichloro-2-chloroacetoxy-4-methylpentene-4, B.P. 121°/11, 1,1,1-trichloro-2-acetoxy-4-methylpentene-4, B.P. 96°–98°/11, 1,1,1-trichloro-2-benzoyloxy-4-methylpentene-4, B.P. 100°–105°/0.005, 1,1,1-trichloro-2-(p-chlorobenzoyloxy)-4-methylpentene-4, M.P. 95°–97°.

Alcohols of formula III are, e.g. methanol, ethanol, isopropyl alcohol, n-butanol, tert-butanol, n-amyl alcohol, cyclohexanol, benzyl alcohol, α- or β-phenylethanol and phenol; the reaction is preferably performed in methanol to give methoxy compounds.

The treatment of 1,1,1-trichloro-2-hydroxyalkenes-4 of formula II in an excess of a defined alcohol in the presence of alkali is advantageously carried out at the boiling point of the reaction mixture.

As alkalies it is advantageous to use, in the process according to the invention, alkali metal hydroxides or alkaline-earth metal hydroxides, such as lithium, sodium, calcium and barium hydroxide, particularly however potassium hydroxide. Instead of the hydroxides, it is also possible to use the corresponding carbonates.

The alkali is preferably used in a slight excess of the stoichiometrically required amount.

The salts of formula Ib obtained after completion of the reaction can be isolated and purified in the usual manner, e.g. by filtration under suction, and washing. The free salts are obtained, for example, by acidification of the aqueous salt solutions, and subsequent extraction of the acid with a suitable solvent, such as diethyl ether or chloroform. After removal of the solvent, the free acid is obtained, and can be purified by recrystallisation.

1-Alkoxycarboxylic acid esters of formula Ia wherein X represents an alkoxy radical having 1 to 6 carbon atoms can be obtained by known methods; e.g., by esterification of the free carboxylic acids with corresponding alcohols with the addition of acid, such as concentrated sulphuric acid. 1-Alkoxycarboxylic acid amides can be produced, for example, from these esters by means of reaction with ammonia, or with an amine of the formula

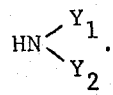

A further possibility for the preparation of the esters of formula Ia according to the invention consists in the treatment of the starting products in an anhydrous medium with an alkali metal alkoxide such as sodium methylate, potassium ethylate or sodium amylate; and the subsequent liberation, in the usual manner, of the corresponding esters. As the anhydrous medium it is preferable to use the alcohol corresponding to the employed alkali metal alkoxide.

In the form of their free carboxylic acids, esters and amides, the compounds of formula Ia and Ib according to the invention are generally colourless substances which, at room temperature, are liquid or wax-like or crystalline, and which are practically insoluble in water, but readily soluble, on the other hand, in conventional organic solvents such as methanol, ethanol, diethyl ether, dioxane and chloroform. The corresponding salts are crystalline, normally water-soluble substances.

The following examples illustrate the process according to the invention. Temperatures are expressed in degrees Centigrade.

EXAMPLE 1

Production of 1-methoxy-3-methylbut-3-enecarboxylic acid [= Compound No. 1]

An amount of 40.6 g (0.2 mole) of 1,1,1-trichloro-2-hydroxy-4-methylpentene-4 is added dropwise, with stirring, to a suspension of 49 g (0.88 mole) of pulverulent potassium hydroxide in 500 ml of methanol. The reaction mixture is subsequently heated until gently boiling, and held for 2 hours at this temperature. The precipitated potassium salt is then filtered off by suction, and the excess methanol removed in a rotary evaporator. The residue is dissolved in 160 ml of water, and the obtained aqueous solution extracted twice with 100 ml of diethyl ether each time. The extract is disregarded and the aqueous phase acidified with 17 ml of concentrated hydrochloric acid. The precipitated carboxylic acid is thereupon extracted three times with 100 ml of diethyl ether each time; it is then dried over sodium sulphate, and the diethyl ether removed by evaporation. There is obtained, by distillation of the residue at 70°/0.003 Torr, an amount of 20 g (71% of theory) of 1-methoxy-3-methylbut-3-enecarboxylic acid; $n_{20}^D = 1.4503$.

The 1,1,1-trichloro-2-hydroxy-4-methylpentene-4 used in paragraph 1 of the above example was produced as follows:

An amount of 20 g of finely powdered aluminum chloride is suspended in 2000 ml of carbon disulphide, and the obtained suspension cooled to −10°. An addition is then made dropwise within 30 minutes at −10°, with stirring, of a mixture, cooled to −40°, of 224 g (4 moles) of isobutylene and 588 g (4 moles) of chloral; and stirring is continued, after completion of the dropwise addition, for 2 hours at 0°. A mixture of 288 ml of concentrated hydrochloric acid and 2400 ml of water is thereupon added; the whole is stirred for 10 minutes and the phases then separated. The aqueous phase is extracted with 200 ml of carbon disulphide; the two organic phases are then combined and dried over magnesium sulphate. The solvent is finally removed, and the residue distilled at 92/93°/12 Torr; yield: 563.7 g (69% of theory).

| Analysis: | | | | | | | |
|---|---|---|---|---|---|---|---|
| Calculated: | C | 35.41 | H | 4.46 | Cl | 52.27 |
| Found: | C | 35.67 | H | 4.76 | Cl | 52.09 |

EXAMPLE 2

Production of 1-methoxy-eicos-3-enecarboxylic acid [= Comp. No. 24]

An amount of 107 g (0.26 mole) of 1,1,1-trichloro-2-hydroxyheneicosene-4 is dissolved in 125 ml of methanol, and the solution added dropwise, with stirring, to a suspension of 61 g (1.1 moles) of potassium hydroxide in 625 ml of methanol. The reaction mixture is subsequently refluxed for 6 hours. The excess methanol is then removed in a rotary evaporator, and the residue dissolved in 1.2 litres of hot water. The obtained solution is extracted with 500 ml of diethyl ether, and the ether extract discarded. The aqueous phase is acidified with concentrated hydrochloric acid, and then extracted three times with 100 ml of diethyl ether each time.

The extracts are combined, and dried over sodium sulphate; the solvent is then removed and the residue distilled at 203°–205°/0.05 Torr. An amount of 42.4 g (49.4% of theory) of a wax-like product is obtained which, after recrystallisation three times from n-pentane, has a melting point of 48°–51°.

EXAMPLE 3

Production of 1-methoxy-hept-3-enecarboxylic acid [Comp. No. 7]

a. Amounts of 23.2 g (0.1 mole) of 1,1,1-trichloro-2-hydroxyoctene-4 and 33.0 g (0.445 mole) of calcium hydroxide are refluxed in 300 ml of methanol, and the whole maintained at this temperature for 4 days. The excess methanol is then removed in a rotary evaporator, and the residue taken up in 350 ml of water. The obtained alkaline solution is extracted three times with diethyl ether. The aqueous phase is acidified with concentrated hydrochloric acid, and the precipitated carboxylic acid extracted with diethyl ether; it is dried over magnesium sulphate, and the diethyl ether then evaporated; yield: 6.7 g (39% of theory); B.P. 81°/0.003 Torr.

b. Amounts of 46 g (0.2 mole) of 1,1,1-trichloro-2-hydroxyoctene-4 and 94.2 g (0.89 mole) of sodium carbonate are refluxed in 600 ml of methanol, and maintained for 4 days at this temperature. The excess methanol is removed in a rotary evaporator, and the residue taken up in 700 ml of water. The obtained alkaline solution is extracted three times with diethyl ether. The aqueous phase is acidified with concentrated hydrochloric acid, and the precipitated carboxylic acid extracted with diethyl ether; it is dried over magnesium sulphate, and the diethyl ether evaporated; yield: 17.5 g (50.9% of theory).

EXAMPLE 4

Production of 1-methoxy-dec-3-enecarboxylic acid methyl ester [Compound 28]

An amount of 27.4 g (0.1 mole) of 1,1,1-trichloro-2-hydroxy-undecene-4 is dissolved in 250 ml of methanol. The obtained solution is added dropwise to a suspension of 29.9 g (0.44 mole) of pulverulent potassium methoxide in 250 ml of absolute methanol. After completion of the dropwise addition, the reaction mixture is refluxed for 7 hours, and subsequently cooled to ca. 25°. The precipitated potassium chloride is filtered off, and hydrogen chloride fed into the ice-cooled reaction solution until saturation is attained. The reaction mixture is then allowed to stand for 12 hours; the methanol is afterwards removed in a rotary evaporator, the residue poured into 500 ml of water, and the precipitated oil extracted with diethyl ether. The ether solution is subsequently washed until neutral with sodium bicarbonate solution. After removal of the diethyl ether by evaporation, the reaction product is distilled off at 88°–90°/0.8 Torr; yield: 9.8 g (43% of theory); $n_{20}^D$ = 1.444; B.P. = 70°–72°/0.002 Torr. A comparison, (including IR-spectrum) of the obtained ester with the methyl ester obtained by esterification of 1-methoxy-dec-3-enecarboxylic acid shows that the two products are identical.

EXAMPLE 5

Production of 1-methoxy-heptadec-3-enecarboxylic acid-N,N-diethylamide (Compound No. 40) and -carboxylic acid-n-propyl ester (Compound No. 41)

By reaction of the compound 1-methoxy-heptadec-3-enecarboxylic acid, produced analogously to the preceding examples, with thionyl chloride there is obtained, as also in a similar manner in the case of other compounds of formula I, the corresponding carboxylic acid chloride, which is separable by distillation, in addition to a butenolide of the formula

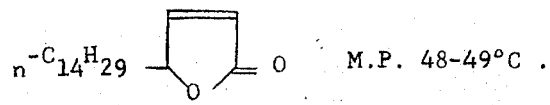

The desired 1-methoxy-heptadec-3-enecarboxylic acid chloride can then be converted, in the usual manner, with diethylamine into the semicrystalline carboxylic acid diethylamide, and with n-propanol into the carboxylic acid-n-propyl ester, M.P. 48°–49°.

EXAMPLE 6

Production of 1-methoxy-dec-3-enecarboxylic acid-N-ethylamide (Compound 45)

By reaction of the analogously obtained 1-methoxy-dec-3-enecarboxylic acid with thionyl chloride there is produced, by conventional methods, the corresponding acid chloride, and this converted, after separation by distillation from a secondarily formed butenolide, by treatment with N-ethylamine into 1-methoxy-dec-3-enecarboxylic acid-N-ethylamide; B.P. ca. 120°/0.002 Torr; $n_{26}^D$ = 1.6432.

EXAMPLE 7

A. Production of a Na-salt

An amount of 21.43 g of 1-methoxy-dec-3-enecarboxylic acid is dissolved in 150 ml of absolute ethanol, and the solution added to a solution of 4.0 g of solid sodium hydroxide in 150 ml of ethanol. After 5 hours' stirring at room temperature, the whole is concentrated in a rotary evaporator. There remains an amount of 22.2 g of a light-yellow, highly viscous, and very hygroscopic substance, which is then further dried at 60° and 14 Torr over NaOH (Compound No. 43).

B. Production of an ammonio salt

An amount of 21.43 g of 1-methoxy-dec-3-enecarboxylic acid is dissolved in 150 ml of absolute ethanol, and the solution added to a solution of 22.5 g of 95% 1-dimethylaminododecane in 150 ml of ethanol. After 5 hours' stirring, and concentration in a rotary evaporator, there is obtained an amount of 43.8 g of a light-yellow oil (Compound No. 50).

C. Production of a Ca-salt

An amount of 14.3 g of 1-methoxy-undec-3-enecarboxylic acid is dissolved in 150 ml of absolute ether, and the solution then added, at room temperature, to a suspension consisting of 1.31 g of calcium hydroxide and 100 ml of absolute ether. An addition to the suspension is slowly made dropwise of 1 ml of water. After 2 hours, the solution, which has become clear, is concentrated to dryness in a rotary evaporator. There is obtained an amount of 14.5 g of Ca-salt of 1-methoxy-undec-3-enecarboxylic acid, M.P. 170°C (Compound No. 42).

The following compounds of formula V are produced according to Examples 1 to 7:

$$R_1-CH=C(R_3)-CH_2-CH(OR_4)-CO-X \qquad (V)$$

| No. | $R_1$ | $R_3$ | $R_4$ | X | Boiling point °C/Torr |
|---|---|---|---|---|---|
| 1 | H | $CH_3$ | $CH_3$ | —OH | 70/0.003 |
| 2 | H | $CH_3$ | $C_2H_5$ | —OH | 75/0.003 |
| 3 | H | $CH_3$ | iso—$C_3H_7$ | —OH | 85/0.003 |
| 4 | H | $CH_3$ | n—$C_4H_9$ | —OH | 78–80/0.015 |
| 5 | H | $CH_3$ | Cyclohexyl | —OH | 85–88/< 0.003 |
| 6 | H | $CH_3$ | $C_6H_5$ | —OH | 125–130/0.04 |
| 7 | n—$C_3H_7$ | H | $CH_3$ | —OH | 81/0.003 |
| 8 | n—$C_3H_7$ | H | $C_2H_5$ | —OH | 90/0.012 |
| 9 | n—$C_4H_9$ | H | $CH_3$ | —OH | 112/0.015 |
| 10 | n—$C_5H_{11}$ | H | $CH_3$ | —OH | 95/0.003 |
| 11 | n—$C_6H_{13}$ | H | $CH_3$ | —OH | 110–113/0.001 |
| 12 | n—$C_6H_{13}$ | H | $C_2H_5$ | —OH | 114/0.01 |
| 13 | n—$C_6H_{13}$ | H | iso—$C_3H_7$ | —OH | 116/0.04 |
| 14 | n—$C_6H_{13}$ | H | n—$C_4H_9$ | —OH | 127/0.003 |
| 15 | n—$C_7H_{15}$ | H | $CH_3$ | —OH | 142/0.015 |
| 16 | n—$C_8H_{17}$ | H | $CH_3$ | —OH | 134/0.001 |
| 17 | n—$C_9H_{19}$ | H | $CH_3$ | —OH | 140–142/0.006 |
| 18 | n—$C_{10}H_{21}$ | H | $CH_3$ | —OH | 145–147/0.03 |
| 19 | n—$C_{11}H_{23}$ | H | $CH_3$ | —OH | 152–153/0.01 |
| 20 | n—$C_{12}H_{25}$ | H | $CH_3$ | —OH | 175–178/0.05 |
| 21 | n—$C_{13}H_{27}$ | H | $CH_3$ | —OH | M.P. 63° |
| 22 | n—$C_{14}H_{29}$ | H | $CH_3$ | —OH | 194–200°/0.001 |
| 23 | n—$C_{15}H_{31}$ | H | $CH_3$ | —OH | M.P. 68–70° |
| 24 | n—$C_{16}H_{33}$ | H | $CH_3$ | —OH | M.P. 48–51° |
| 25 | H | $CH_3$ | $CH_3$ | —NH—$tC_4H_9$ | B.P. 98–100°/12 |
| 26 | n—$C_7H_{15}$ | H | $CH_3$ | —NH—$(CH_2)_2$—$CH(CH_3)_2$ | B.P. 130–132°/0.001 |
| 27 | n—$C_7H_{15}$ | H | $CH_3$ | —$OCH_3$ | B.P. 88°/0.8 |
| 28 | n—$C_8H_{13}$ | H | $CH_3$ | —$OCH_3$ | B.P. 70–72°/0.002 |
| 29 | n—$C_{16}H_{33}$ | H | $CH_3$ | —$OCH_3$ | B.P. 200°/0.001 |
| 30 | n—$C_{15}H_{31}$ | H | $CH_3$ | —$NH_2$ | $n_D^{20}$ 1.4805 |
| 31 | n—$C_7H_{15}$ | H | $CH_3$ | —$NH_2$ | $n_D^{20}$ 1.4767 |
| 32 | n—$C_7H_{15}$ | H | $CH_3$ | —$NHCH_3$ | $n_D^{20}$ 1.4802 |
| 33 | n—$C_7H_{15}$ | H | $CH_3$ | —NH—n$C_5H_{11}$ | $n_D^{20}$ 1.4733 |
| 34 | n—$C_7H_{15}$ | H | $CH_3$ | —O—n$C_6H_{13}$ | B.P. 110°/0.001 |
| 35 | n—$C_{10}H_{21}$ | H | $CH_3$ | —$OCH_3$ | B.P. 158°/1.2 |
| 36 | n—$C_{11}H_{23}$ | H | $CH_3$ | —$OC_2H_5$ | B.P. 155°/0.2 |
| 37 | n—$C_{11}H_{23}$ | H | $CH_3$ | —$N(CH_3)_2$ | $n_D^{20}$ 1.4772 |
| 38 | n—$C_5H_{11}$ | H | $CH_3$ | —NH—$iC_3H_7$ | $n_D^{20}$ 1.4608 |
| 39 | n—$C_5H_{11}$ | H | $CH_3$ | —O—Cyclohexyl | B.P. 135°/0.3 |
| 40 | n—$C_{13}H_{27}$ | H | $CH_3$ | —$N(CH_3)_2$ | M.P. ca. 25°C |
| 41 | n—$C_{13}H_{27}$ | H | $CH_3$ | —O—n$C_3H_7$ | B.P. 220°/0.001 |
| 42 | n—$C_7H_{15}$ | H | $CH_3$ | —O[Ca ½] | M.P. ca. 170° |
| 43 | n—$C_6H_{13}$ | H | $CH_3$ | —ONa | $n_D^{20}$ 1.4664 |
| 44 | n—$C_6H_{13}$ | H | $CH_3$ | —OK | $n_D^{20}$ 1.4673 |
| 45 | n—$C_6H_{13}$ | H | $CH_3$ | —$NHC_2H_5$ | B.P. 120°/0.002 |
| 46 | n—$C_6H_{13}$ | H | $CH_3$ | —OH $^+N(C_2H_5)_3$ | $n_D^{20}$ 1.4655 |

As well as the compounds:

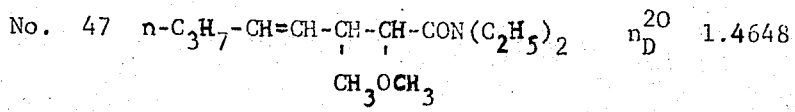

No. 47  n-$C_3H_7$-CH=CH-CH-CH-CON$(C_2H_5)_2$    $n_D^{20}$ 1.4648
                         |
                       $CH_3OCH_3$

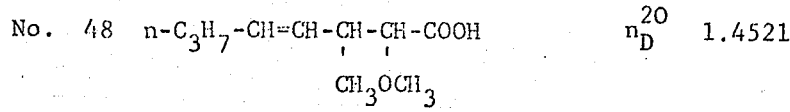

No. 48  n-$C_3H_7$-CH=CH-CH-CH-COOH    $n_D^{20}$ 1.4521
                         |
                       $CH_3OCH_3$

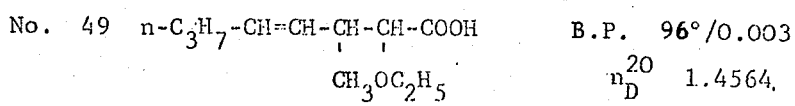

No. 49  n-$C_3H_7$-CH=CH-CH-CH-COOH    B.P. 96°/0.003
                         |                $n_D^{20}$ 1.4564
                       $CH_3OC_2H_5$

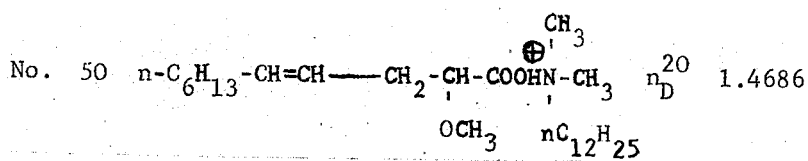

No. 50  $n\text{-}C_6H_{13}\text{-}CH=CH\text{---}CH_2\text{-}CH\text{-}COOHN\text{-}CH_3$  $n_D^{20}$  1.4686
         $\hspace{3cm} | \hspace{1.3cm} \overset{\oplus}{|} \overset{CH_3}{}$
         $\hspace{3cm} OCH_3 \hspace{0.5cm} nC_{12}H_{25}$ The new compounds of formulae Ia and Ib regulate the growth in a varying manner of parts of plants above and below the soil. They are effective either in the cis form or in the trans form; for preparative reasons, however, they are generally used in the form of cis/trans mixtures. Applied in normal concentrations, they are moreover not phytotoxic, and have negligible toxicity towards warm-blooded animals. The active substances produce no morphological changes or damage which would lead to the withering of the plants. The compounds are not mutagenic. Their action differs from that of a herbicidal active substance and of a fertiliser.

The new compounds of formula Ia and of formula Ib influence, in particular, vegetative plant growth and development of the fruit, as well as the formation of abscission tissues between stalk and leaf, or between stalk and fruit. Consequently, fruit of all types, such as, e.g. citrus fruits, stone fruit, pomaceous fruit, nuts, berries, grapes or oil fruits, can be picked off with minimum application of force, either manually or with machines developed for the purpose.

Damage to the foliage and branches of the tree or bush normally occurring when crops are gathered by vigorous shaking of the tree or bush, or when fruit is torn off, is largely avoided.

The following test demonstrates the action of the new compounds as agents for effecting the abscission of citrus fruits.

BIOLOGICAL TEST I

It was determined in the case of citrus fruit — Hamlin oranges — that abscission of the fruit occurs appreciably easier after application of the active substances. As solutions of 2000 and 4000 ppm, respectively, active substances were sprayed on to branches well hung with Hamlin oranges. The results of the test were evoluted after 7 days by the method developed by W. C. Wilson and C. H. Hendershott, cp. Proc.Am.Soc.Hort.Sc. 90, 123–129 (1967). In this test the force required for the abscission of the fruit is measured in kg.

| Compound No. | Concentration | Force in kg |
|---|---|---|
| 8 | 2000 ppm | 7.8 |
|   | 4000 ppm | 2.4 |
| 5 | 2000 ppm | 6.6 |
|   | 4000 ppm | 6.0 |
| 11 | 2000 ppm | 3.5 |
|    | 4000 ppm | 1.7 |
| 17 | 2000 ppm | 6.4 |
|    | 4000 ppm | 5.6 |
| 7 | 2000 ppm | 5.2 |
|   | 4000 ppm | 4.9 |
| 2 | 2000 ppm | 6.1 |
|   | 4000 ppm | 6.5 |
| 9 | 2000 ppm | 6.8 |
|   | 4000 ppm | 5.1 |
| 49 | 2000 ppm | 8.2 |
|    | 4000 ppm | 7.4 |
| 10 | 2000 ppm | 9.1 |
|    | 4000 ppm | 9.4 |
| 12 | 2000 ppm | 6.2 |
|    | 4000 ppm | 5.9 |
| 13 | 2000 ppm | 11.2 |
|    | 4000 ppm | 6.5 |

-Continued

| Compound No. | Concentration | Force in kg |
|---|---|---|
| 14 | 4000 ppm | 6.1 |
| 44 | 4000 ppm | 4.5 |
| Untreated Control test | — | 11.7 |

There were no signs of damage whatsoever on the fruit. No unripe fruit was removed, and either no leaves or a very small number at most were detached.

On the other hand, it is also possible, with application of the active substances in a specific concentration, to initiate the leaf-fall of certain cultivated plants such as cotton, soya bean, ornamental shrubs, French beans, and garden peas, an effect which likewise is of commercial significance.

Tests also showed that, in the case of fruit trees, there also occurs a thinning of blossom and fruit.

The compounds according to the invention also regulate the growth of plants. In the case of monocotyledons it was shown that an increase in tillering occurred with a simultaneous reduction of the growth in height. Applied to dicotyledons, the mentioned compounds inhibit terminal growth, without damaging the foliage of the plants. This is of practical importance, e.g. for the control of undesired side shoots on tobacco plants. These side shoots must in practice be removed in order to avoid quantitative and qualitative losses in leaf-yield. Various ornamental plants, e.g. azalea and chrysanthemums, are pinched by hand, i.e. the main shoot is cut off or broken off so that the plant forms branches. The stated compounds can be used for this purpose too, in order to inhibit or kill off the young terminal buds.

BIOLOGICAL TEST II

The following test shows the action of the new compounds as agents for the suppression of undesired side shoots on tobacco plants (Sucker control):

Tobacco plants of the variety Sota-27 were cultivated in the open. Immediately after the normal cutting of the influorescence, 5 plants per treatment were sprayed with solutions of 5000 ppm of the given active substances. The results of the test were assessed after 17 days. Compared with the amount of side shoots on the untreated plants, the amount of undesirable side shoots was reduced on the plants treated with Compounds No. 11 and No. 12 to an extent requiring a concentration of at least 20,000 ppm of the known active substance mixture known under the trade-name of "Off-Shoot T", consisting mainly of octanol and decanol, as well as of further alcohols of medium chain length.

BIOLOGICAL TEST III

Azalea of the variety "Collestin" were cultivated in a greenhouse at 20°–21°C with 70% relative humidity and with the action of light for 12 hours per day. Five well rooted seedlings in each case were sprayed until dripping wet with active substance solutions of a specific concentration. An assessment was made after 9 weeks of the number of side shoots formed by the plants.

| Compound No. | Conc. [ppm] | Number of side shoots |
| --- | --- | --- |
| 11 | 10 000 | 2 |
|  | 5 000 | 1 |
| 12 | 10 000 | 2 |
|  | 5 000 | 0 |
| 14 | 10 000 | 1 |
|  | 5 000 | 1 |
| "Off-Shoot O" | 30 000 | 3 |
|  | 10 000 | 0 |
| untreated control | — | 0 |

With the active substances No. 11 and No. 12, moreover, the terminal buds too of the treated plants were killed off. The commercial product "Off-Shoot O" is a mixture of the methyl esters of $C_6$- to $C_{12}$-alkanecarboxylic acids.

The extent and the nature of the action depend on the most diverse factors, these varying according to the type of plant; in particular, however, they depend on the applied concentration, and on time of application with regard to the stage of development of the plants and of the fruit. Thus, for example, plants of which the fruit is utilised are treated immediately after blossoming, or at an appropriate point of time before harvesting. The active substances are applied in the form of solid or liquid agents, and are applied to parts of plants above the soil, on to the surface of the soil, or into the soil. The preferred application is that to parts of plants above the soil, for which application solutions or aqueous dispersions are most suitable. In addition to solutions and dispersions for the treatment of the growth substrate (soil), dusting agents, granulates and scattering agents are also suitable.

Some of the new compounds of formula Ia and Ib, such as 1-methoxy-nonadec-3-enecarboxylic acid and 1-methoxyeicos-3-enecarboxylic acid, as well as some of the starting products of formula II, for example, 1,1,1-trichloro-2-hydroxy-tetradecene-4, 1,1,1-trichloro-2-hydroxy-pentadecene-4, 1,1,1-trichloro-2-hydroxy-undecene-4, and 1,1,1-trichloro-2-hydroxy-tridecene-4, possess moreover insecticidal and acaricidal properties, and can be used, e.g. for the control of pests affecting hygiene and of plant-eating insects.

Agents according to the invention are produced in a manner known per se by the intimate mixing and grinding of active substances of formula Ia or Ib with suitable carriers, optionally with the addition of dispersing agents or solvents which are inert to the active substances. The active substances can be obtained and used in the following forms:

solid preparations: dusts, scattering agents, granulates, (coated granulates, impregnated granulates and homogeneous granulates);
water-dispersible concentrates of the active substance: wettable powders, pastes, emulsions;
liquid preparations: solutions.

The solid preparations (dusts, scattering agents, granulates) are produced by the mixing of the active substances with solid carriers. Suitable carriers are, e.g. kaolin, talcum, bole, loess, chalk, limestone, ground limestone, Attaclay, dolomite, diatomaceous earth, precipitated silicic acid, alkaline-earth silicates, sodium and potassium aluminum silicates (feldspar and mica), calcium and magnesium sulphates, magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extractions, active charcoal, etc., alone or in admixture with each other.

The particle size of the carriers is for dusts advantageously up to about 0.1 mm; for scattering agents from about 0.075 mm to 0.2 mm; and for granulates 0.2 mm or coarser.

The concentrations of active substance in the solid preparation forms are from 0.5 to 80 percent.

To these mixtures may also be added additives stabilising the active substance, and/or non-ionic, anion-active, and cation-active substances, which, for example, improve the adhesiveness of the active substances on plants and on parts of plants (adhesives and agglutinants), and/or ensure a better wettability (wetting agents) and dispersibility (dispersing agents). Suitable adhesives are, for example, the following: olein/chalk mixture, cellulose derivatives (methyl cellulose, carboxymethyl cellulose), hydroxyethylene glycol ethers of monoalkyl and dialkyl phenols having 5 to 15 ethylene oxide radicals per molecule and 8 to 9 carbon atoms in the alkyl radical, ligninsulphonic acid, its alkali metal and alkaline-earth metal salts, polyethylene ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e., wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents. The concentration of active substance in these agents is 5 to 80 percent.

The wettable powders and the pastes are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkali-metal and alkaline-earth metal salts.

Suitable anti-foam agents are, for example, silicones.

The active substances are so mixed, ground, sieved and strained with the above mentioned additives that the solid constituent in the case of wettable powders has a particle size not exceeding 0.02 to 0.04 mm, and in the case of pastes not exceeding 0.03 mm. Dispersing agents such as those mentioned in the preceding paragraphs, organic solvents and water are used in the preparation of emulsion concentrates and pastes. Suitable solvents are, e.g. the following: alcohols, benzene, xylenes, toluene, dimethylsulphoxide N,N-dialkylated amides, N-oxides of amines, especially trialkylamines, and mineral oil fractions boiling in the range of 120° to 350°. The solvents must be practically odourless, non-phytotoxic, inert to the active substances, and not readily inflammable.

Furthermore, the agents according to the invention can be used in the form of solutions. For this purpose the active substance (or several active substances) of formula I*a* or I*b* is (or are) dissolved in suitable organic solvents, mixtures of solvents, water, or mixtures of organic solvents with water. as organic solvents it is possible to use aliphatic and aromatic hydrocarbons, their chlorinated derivatives, alkylnaphthalenes, mineral oils on their own or in admixture with each other. The solutions should contain the active substances in a concentration of from 1 to 20 percent. These solutions can be applied either with the aid of a propellent gas (as a spray), or with special spraying devices (such as aerosol).

Other biocidal active substances or agents may be added to the described agents according to the invention. For the widening of their sphere of action, the new agents can also contain, in addition to the stated compounds of formula I*a* or I*b*, e.g. insecticides, fungicides, bactericides, fungistatics, bacteriostatics or nematocides. The agents according to the invention can also contain fertilisers, trace elements, etc..

Preparations of the new active substances of formula I*a* or I*b* are described in the following. The term 'parts' denotes parts by weight.

GRANULATE

The following substances are used for the preparation of a 5 percent granulate:

| | |
|---|---|
| 5 | parts of 1-methoxy-decene-3-carboxylic acid, |
| 0.25 | parts of epichlorohydrin, |
| 0.25 | parts of cetyl polyglycol ether, |
| 3.50 | parts of polyethylene glycol, |
| 91.00 | parts of kaolin (particle size 0.3 – 0.8 mm). |

The active substance is mixed with epichlorohydrin and the whole dissolved in 6 parts of acetone; polyethylene glycol and cetyl polyglycol ether are then added. The thus obtained solution is sprayed on to kaolin, and the acetone subsequently evaporated off in vacuo.

WETTABLE POWDER

The following constituents are used for the preparation of a) a 40%, b) a 50%, c) a 25% and d) a 10% wettable powder:

| | | |
|---|---|---|
| a) | 40 | parts of 1-methoxy-decene-3-carboxylic acid, |
| | 5 | parts of sodium lignin sulphonate, |
| | 1 | part of sodium dibutyl naphthalene sulphonate, |
| | 54 | parts of silicic acid; |
| b) | 50 | parts of 1-methoxy-decene-3-carboxylic acid, |
| | 5 | parts of alkylarylsulphonate ("Tinovetin B"), |
| | 10 | parts of calcium lignin sulphonate, |
| | 1 | part of Champagne chalk/hydroxyethylcellulose mixture (1:1), |
| | 20 | parts of silicic acid, |
| | 14 | parts of kaolin; |
| c) | 25 | parts of 1-ethoxy-heptene-3-carboxylic acid, |
| | 5 | parts of the sodium salt of oleyl methyl tauride, |
| | 2.5 | parts of naphthalenesulphonic acid/formaldehyde condensate, |
| | 0.5 | part of carboxymethylcellulose, |
| | 5 | parts of neutral potassium aluminium silicate, |
| | 62 | parts of kaolin; |
| d) | 10 | parts of 1-methoxy-decene-3-carboxylic acid, |
| | 3 | parts of a mixture of the sodium salts of saturated fatty alcohol sulphates, |
| | 5 | parts of naphthalenesulphonic acid/formaldehyde condensate, |
| | 82 | parts of kaolin. |

The active substances are intimately mixed, in suitable mixers, with the additives, and the mixture then ground by means of the appropriate grinding mills and rollers. Wettable powders are obtained which can be diluted with water to obtain suspensions of any desired concentration. Such suspensions are employed, for example, for the removal of undesired side shoots, for the tillering of lawns, and for the rooting of seedlings and cuttings, etc..

EMULSION CONCENTRATE

The following constituents are mixed together for the preparation of 25 percent emulsion concentrates:

| | | |
|---|---|---|
| a) | 25 | parts of 1-ethoxy-heptene-3-carboxylic acid, |
| | 5 | parts of a mixture of nonylphenolpolyoxyethylene and calcium dodecylbenzenesulphonate, |
| | 70 | parts of xylene; |
| b) | 25 | parts of 1-methoxy-decene-3-carboxylic acid, |
| | 10 | parts of a mixture of nonylphenolpolyoxyethylene and calcium dodecylbenzenesulphonate, |
| | 65 | parts of cyclohexanone. |

This concentrate can be diluted with water to obtain emulsions of suitable concentration. Such emulsions are suitable for the thinning of blossom and fruit, for the accelerated ripening of fruits, and for the promotion of fruit- and leaf-abscission.

We claim:

1. 1-methoxy-dec-3-enecarboxylic acid and the alkali metal and alkaline-earth metal salts thereof.

* * * * *